F. LOTTER.
BEET TOPPER.
APPLICATION FILED NOV. 17, 1910.
999,381.
Patented Aug. 1, 1911.
3 SHEETS—SHEET 1.
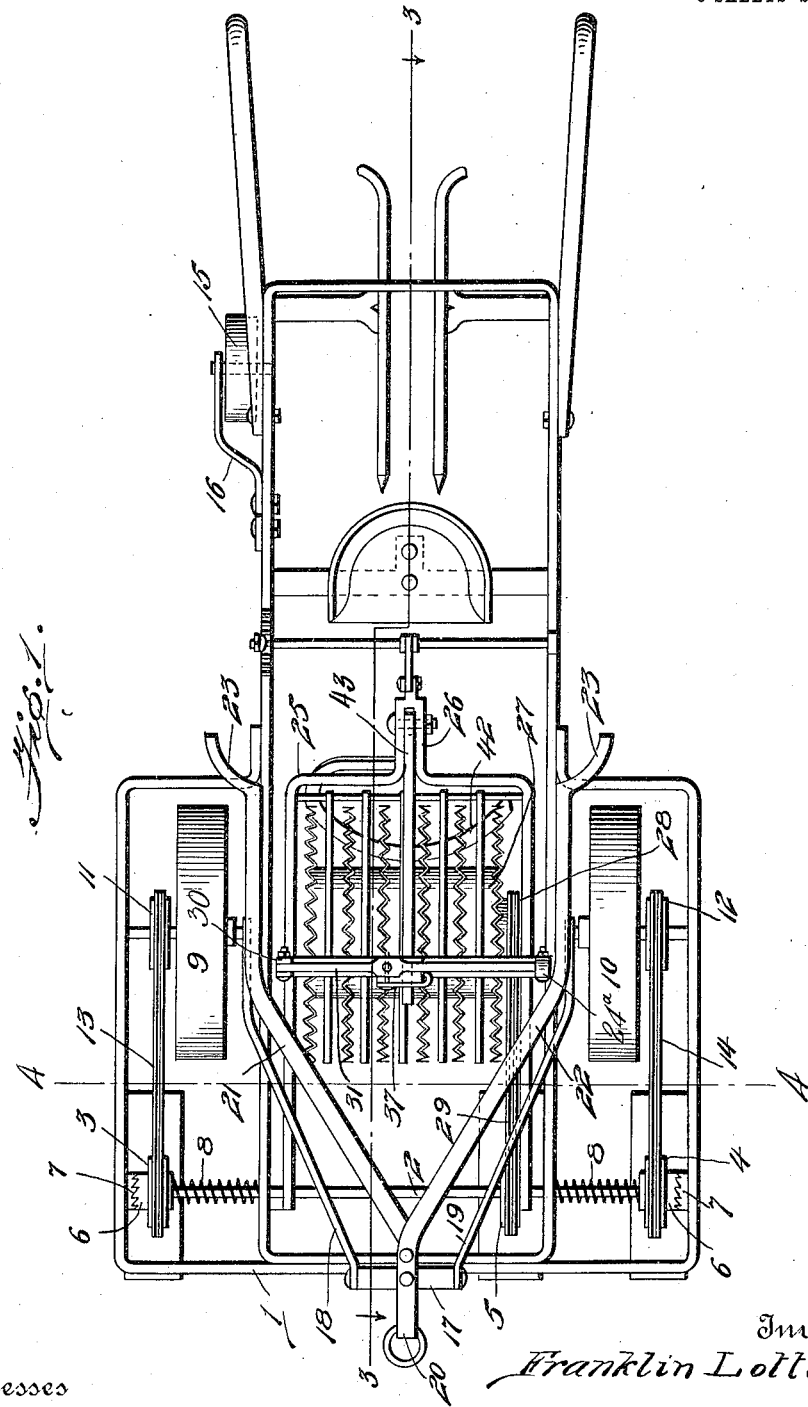

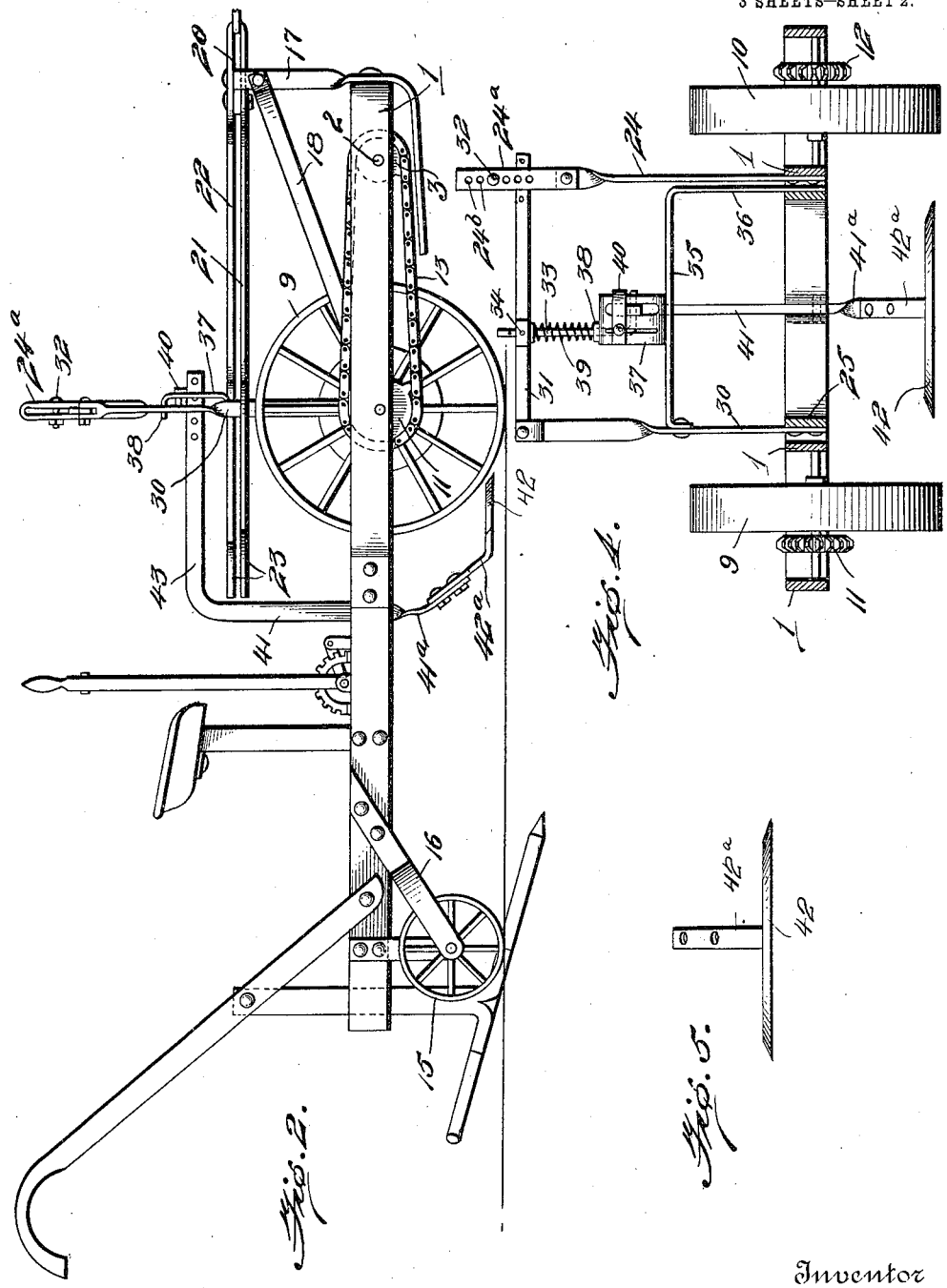

F. LOTTER.
BEET TOPPER.
APPLICATION FILED NOV. 17, 1910.
999,381.
Patented Aug. 1, 1911.
3 SHEETS—SHEET 3.
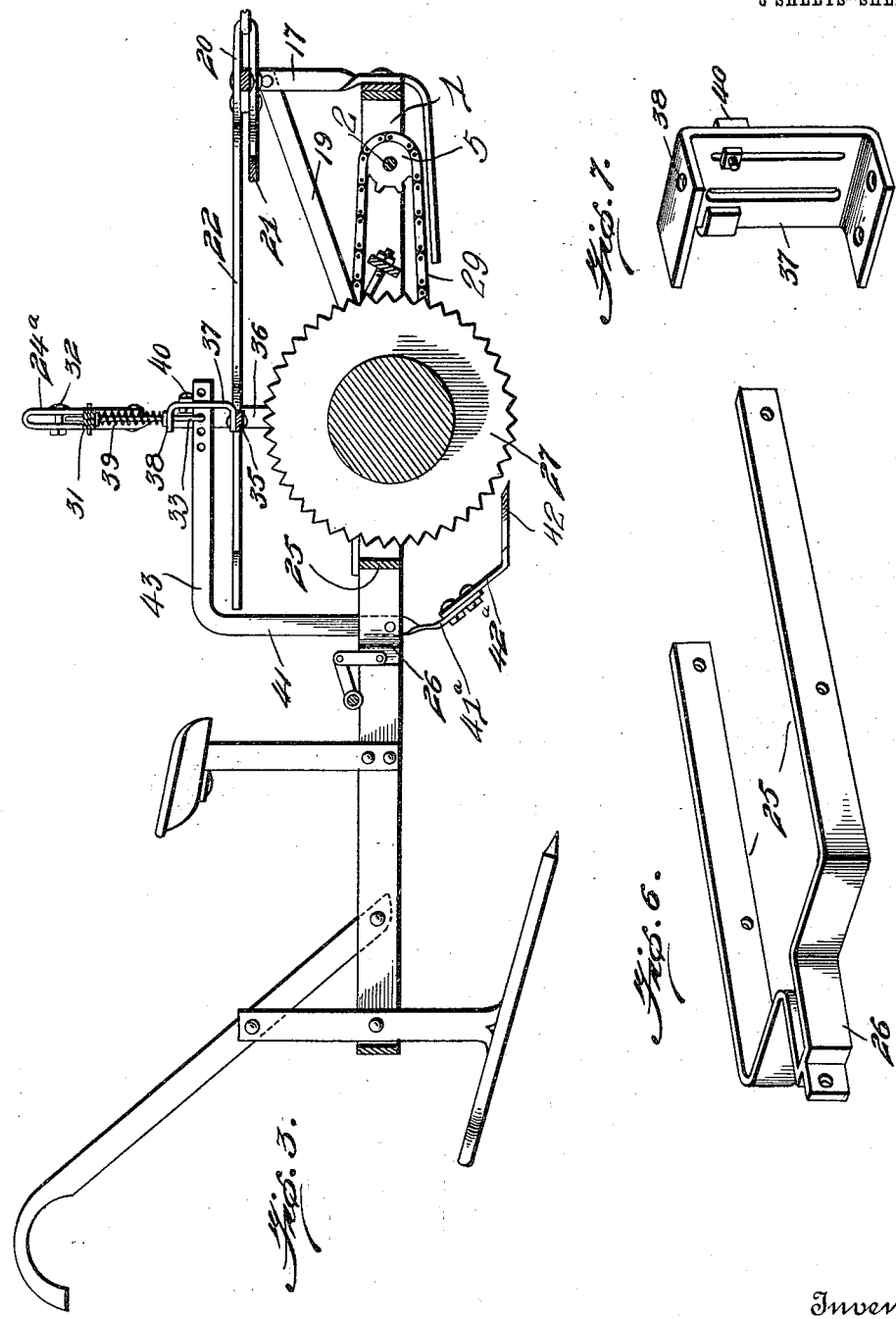

UNITED STATES PATENT OFFICE.

FRANKLIN LOTTER, OF ELKTON, MICHIGAN.

BEET-TOPPER.

999,381. Specification of Letters Patent. Patented Aug. 1, 1911.

Application filed November 17, 1910. Serial No. 592,883.

*To all whom it may concern:*

Be it known that I, FRANKLIN LOTTER, a citizen of the United States, residing at Elkton, in the county of Huron and State of Michigan, have invented certain new and useful Improvements in Beet-Toppers; and I do declare the following to be a full, clear, and exact description of the invention, such as will enable others skilled in the art to which it appertains to make and use the same.

This invention relates to an improved knife adjusting mechanism for beet toppers.

The object of the invention is to provide a simply constructed and efficient mechanism for automatically adjusting a beet topping knife, controlled by the size of the beet to be topped.

With this and other objects in view, the invention consists of certain novel features of construction, combination and arrangement of parts as will be more fully described and particularly pointed out in the appended claims.

In the accompanying drawings, Figure 1 is a top plan view of this improved machine; Fig. 2 is a side elevation thereof with parts broken out; Fig. 3 is a longitudinal sectional view taken on the line 3—3 of Fig. 1;
Fig. 4 is a transverse section taken on the line 4—4 of Fig. 1 with the disk wheel removed; Fig. 5 is a detail front elevation of the cutting knife; Fig. 6 is a detail perspective view of the frame 25; Fig. 7 is a detail perspective view of the member 37 and its adjustable stop.

In the embodiment illustrated, a suitable supporting frame 1 is shown which may be constructed of any suitable material, being preferably substantially rectangular in form. A shaft 2 is mounted in the front end of the frame 1 in any suitable bearings, and sprocket wheels 3 and 4 are mounted on opposite ends of said shaft within the frame 1 and a similar wheel 5 is fixed to said shaft intermediate of its ends. Each of the sprocket wheels 3 and 4 is provided with a clutch member as 6 preferably arranged on its outer face and which is designed to be engaged with complementary clutch members as 7 carried by the shaft 2. Coil springs as 8 are arranged on the shaft 2 and bear against the sprocket wheels 3 and 4 to hold the clutch members normally in operative position.

Arranged at opposite sides of the frame 1 are two drive wheels 9 and 10, the axles of which are mounted in suitable bearings in said main frame 1. Sprocket wheels 11 and 12 are fixed to the shafts of these drive wheels, preferably outside the wheels 9 and 10, and are designed to receive sprocket chains 13 and 14 which pass over the sprocket wheels 3 and 4 on the shaft 2 for driving said shaft 2 on the revolving of the drive wheels. The rear end of the main frame 1 is also preferably supported on a wheel 15 mounted in suitable bearings, preferably supported on braces 16 connected with said main frame 1. A substantially inverted U-shaped member 17 is secured at its opposite ends to the front cross bar of the main frame and the upper ends of the legs thereof are preferably connected with the axles of the wheels 9 and 10 by means of suitable brace bars 18 and 19.

A clevis 20 is pivotally mounted on the cross bar of the member 17 and is provided at its rear end with diverging elongated arms 21 and 22 provided with stirrups as 23 adapted to receive the feet of an operator, and by means of which the double or swingle tree connected to said clevis is shifted and the line of draft of the machine thereby changed.

A standard or post 24 is secured to one of the side bars of the main frame and is designed for a purpose hereinafter to be described.

A frame 25 is pivotally mounted at one end on the shaft 2 and is preferably constructed as shown in Fig. 1 in the form of a U-shaped member having the free ends of its legs pivotally engaged with the shaft 2 and with a rearwardly extending loop 26 arranged on its cross bar and which is designed to receive the knife beam to be described.

Revolubly mounted in the frame 25 between the side members or legs thereof is a disk wheel 27 which may be of any suitable or desired construction. A sprocket wheel 28 is fixed to one end of the shaft or axle of said disk wheel and is designed to receive a sprocket chain 29 which also passes over the sprocket wheel 5 fixed to the shaft 2, and by means of which the disk wheel is driven when the wheels 9 and 10 revolve.

A standard 30 is mounted on the frame 25 at the side opposite the post or standard 24, and a lever 31 is fulcrumed at one end on said standard 30, and the free end thereof extends through a loop 24ª formed on the upper end of the post 24, the opposite side members of said loop being provided with a plurality of longitudinally spaced apertures as 24ᵇ to receive a bolt or pin 32 adapted to be arranged above the lever 31 for a purpose to be described. An L-shaped rod 33 is arranged as shown in Fig. 4 with one end extending through an aperture in the lever 31 and held in adjusted position therein by means of a pin 34 which extends through registering apertures in said lever and rod. The free end of the short arm of said lever extends through one of a series of apertures formed in the knife lever to be described. A cross bar 35 extends laterally from the standard 30 and is preferably secured at its other end by means of a depending arm 36 to the opposite side bar of the frame 25. An upright member 37 is secured to the cross bar 35 preferably near the center and is slotted longitudinally to receive the free end of the knife beam to be described, the upper end of said upright 37 being provided with a bearing 38 through which the rod 33 extends and between the upper face of which and the lower face of the lever 31 is mounted a coiled spring 39 wound on said rod, which exerts its tension to hold the knife-beam 41 against the block 40. An adjustable stop 40 is mounted for vertical adjustment by any suitable means and is designed to limit the upward movement of the knife beam.

A substantially U-shaped knife beam 41 is pivoted intermediately of the ends of its cross bar in the loop 26 of the swinging frame 25 and the legs thereof are arranged in vertical alinement, the lower leg 41ª having the knife 42 secured thereto which is adapted to operate at the rear of and below the disk wheel. The other leg 43 of the beam 41 extends forwardly and projects through the central slot in the upright 37 and abuts at its upper edge against the stop 40. The knife 42 is preferably constructed as shown, in the form of a semi-circle, and is about an inch-and-a-half wide, sharpened on its outer edge to adapt it to drop down between thinned beets spaced varying distances apart.

In the operation of this machine when the disk wheel passes over a large beet it causes the frame 25 to move upward and the lever 31 to strike against the pin 32 from which it is normally spaced about two inches, more or less. This striking of the lever 31 against the pin 32 causes the rod 33 to compress the spring 39 and forces the knife beam downward and causes the knife to cut off the proper quantity from the beet being topped. When the disk wheel has passed over a large beet it will drop down again into normal position and the spring 39 will force the lever 31 into normal position and draw the knife beam up against the stop 40. This beam 41 will consequently only move downward when the wheel passes over a large beet, as the lever 31 is always spaced two inches, more or less, from the pin 32, and consequently the disk wheel may pass into a low furrow and the knife will remain in position, as the spring 39 holds the knife beam against the stop 40, and hence no adjustment is required for small beets or beets of ordinary size.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

I claim as my invention:

1. In a beet topper, the combination of a wheeled supporting structure, a beet engaging wheel mounted for vertical movement in said structure, a topping knife, and means for lowering said knife operable by the upward movement of said wheel.

2. In a beet topper, the combination of a wheeled supporting structure, a beet engaging wheel mounted for vertical movement in said structure, a topping knife, and means for lowering said knife operable by the upward movement of said wheel beyond a predetermined point.

3. In a beet topper, the combination of a wheeled supporting structure, a beet engaging wheel mounted for vertical movement in said structure, a topping knife, means for lowering said knife operable by the upward movement of said wheel beyond a predetermined point, and means for limiting the upward movement of said knife.

4. In a beet topper, the combination of a wheeled supporting structure, a beet engaging wheel mounted for vertical movement in said structure, a topping knife, means for lowering said knife operable by the upward movement of said wheel beyond a predetermined point, and adjustable means for limiting the upward movement of said knife.

5. In a beet topper, the combination of a wheeled supporting structure, a frame mounted for vertical movement in said structure, a beet measuring wheel revolubly mounted in said frame, a post extending upwardly from one side of said supporting structure, a post extending upwardly from said frame at the opposite side of said structure and arranged in transverse alinement with said first mentioned post and having an arm extending laterally inward therefrom, a lever pivoted at one end of said frame post and having its other end adjustably engaged with the other post, a U-shaped knife beam fulcrumed intermediately of its crossbar to the rear end of said frame with the legs thereof extending forwardly and spaced vertically, a knife carried by said lower leg, and means on said lateral arm for engaging the free end of the upper leg of said beam for limiting the upward movement.

6. In a beet topper, the combination of a wheeled supporting structure, a frame mounted for vertical movement in said structure, a beet measuring wheel revolubly mounted in said frame, a post extending upwardly from one side of said supporting structure, a post extending upwardly from said frame at the opposite side of said structure and arranged in transverse alinement with said first mentioned post and having an arm extending laterally inward therefrom, a lever pivoted at one end of said frame post and having its other end adjustably engaged with the other post, a U-shaped knife beam fulcrumed intermediately of its cross bar to the rear end of said frame with the legs thereof extending forwardly and spaced vertically, a knife carried by said lower leg, means on said lateral arm for engaging the free end of the upper leg of said beam for limiting the upward movement, and an L-shaped rod having one end engaged with said lever and its other end engaged with the upper end of said knife beam, and a coiled spring arranged on said rod between said beam and lever.

7. In a beet topper, a wheeled supporting main frame and an auxiliary frame pivotally mounted at one end within said main frame, a beet measuring wheel revolubly mounted in said auxiliary frame, a U-shaped knife beam fulcrumed intermediately of its cross bar to the free rear end of said auxiliary frame with its legs spaced vertically, a semi-circular knife secured to the lower leg of said beam, and means connected with the upper end of said beam controlled by said measuring wheel for lowering said knife on the rise of said wheel beyond a predetermined point.

In testimony whereof I have hereunto set my hand in presence of two subscribing witnesses.

FRANKLIN LOTTER.

Witnesses:
W. L. DOYLE,
F. E. DOYLE.

---

Copies of this patent may be obtained for five cents each, by addressing the "Commissioner of Patents, Washington, D. C."